US012443688B2

(12) United States Patent
Lorsignol et al.

(10) Patent No.: US 12,443,688 B2
(45) Date of Patent: Oct. 14, 2025

(54) METHOD AND DEVICE FOR ACCESS CONTROL

(71) Applicant: Orange, Issy-les-Moulineaux (FR)

(72) Inventors: Frédéric Lorsignol, Chatillon (FR); Philippe Le Goff, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 211 days.

(21) Appl. No.: 17/914,520

(22) PCT Filed: Feb. 22, 2021

(86) PCT No.: PCT/FR2021/050306
§ 371 (c)(1),
(2) Date: Sep. 26, 2022

(87) PCT Pub. No.: WO2021/191516
PCT Pub. Date: Sep. 30, 2021

(65) Prior Publication Data
US 2023/0134644 A1 May 4, 2023

(30) Foreign Application Priority Data
Mar. 27, 2020 (FR) .................................. 2003035

(51) Int. Cl.
*G06F 21/36* (2013.01)
*G06F 3/01* (2006.01)
(52) U.S. Cl.
CPC .............. *G06F 21/36* (2013.01); *G06F 3/011* (2013.01); *G06F 2221/2133* (2013.01)
(58) Field of Classification Search
CPC ... G06F 21/36; G06F 2221/2133; G06F 3/011
See application file for complete search history.

(56) References Cited

U.S. PATENT DOCUMENTS

| 8,990,959 | B2 * | 3/2015 | Zhu ......................... G06T 19/20 |
| | | | 726/19 |
| 9,830,444 | B2 * | 11/2017 | Kim ........................ G06F 3/017 |
| 10,095,857 | B1 * | 10/2018 | Mallenahally ......... H04N 23/69 |
| 10,832,485 | B1 * | 11/2020 | Mantri .................... G06F 3/017 |
| 10,860,705 | B1 * | 12/2020 | Ganeshmani ........... G06F 21/62 |

(Continued)

OTHER PUBLICATIONS

S. Pandey, M. Kumar and V. Kumar, "A Retrospect on Different side of CAPTCHA Techniques," 2018 International Conference on Advanced Computation and Telecommunication (ICACAT), Bhopal, India, 2018 (Year: 2018).*

I. F. Ince, Y. B. Salman, M. E. Yildirim and T. -C. Yang, "Execution Time Prediction for 3D Interactive CAPTCHA by Keystroke Level Model," 2009 Fourth International Conference on Computer Sciences and Convergence Information Technology, Seoul, Korea (South), 2009 (Year: 2009).*

(Continued)

*Primary Examiner* — David Garcia Cervetti
(74) *Attorney, Agent, or Firm* — David D. Brush; Westman, Champlin & Koehler, P.A.

(57) ABSTRACT

A method, a device and a system for controlling access to a service by a user. The method is implemented by an access device. The method includes the following steps on the device to verify the human status of a user: obtaining at least one three-dimensional virtual object and associated data, referred to as resolution data; controlling playback of the at least one virtual object for the user; obtaining user interaction data with the at least one virtual object; and if the interaction data correspond to the resolution data, confirming the human status of the user.

9 Claims, 2 Drawing Sheets

(56) References Cited

U.S. PATENT DOCUMENTS

| | | | |
|---|---|---|---|
| 2010/0037147 A1* | 2/2010 | Champion | G06F 21/316 715/751 |
| 2011/0197268 A1 | 8/2011 | Ravikumar et al. | |
| 2016/0300054 A1 | 10/2016 | Turgeman et al. | |
| 2016/0371480 A1* | 12/2016 | Cheung | G06F 16/9535 |
| 2017/0180348 A1* | 6/2017 | Piccolotto | G06F 21/32 |
| 2018/0341779 A1* | 11/2018 | Sawant | G06F 21/31 |
| 2019/0188371 A1* | 6/2019 | Shen | G06F 21/36 |
| 2019/0196588 A1* | 6/2019 | Friedman | G06F 3/0412 |
| 2019/0251242 A1* | 8/2019 | Alleaume | G06F 21/31 |
| 2019/0347399 A1* | 11/2019 | Cramer | G06T 17/20 |
| 2020/0019694 A1* | 1/2020 | Akiu | H04N 13/128 |
| 2020/0097643 A1* | 3/2020 | Uzun | G06V 40/40 |
| 2021/0209214 A1* | 7/2021 | Martin | G06F 3/013 |
| 2022/0408269 A1* | 12/2022 | Termanini | H04L 63/0853 |
| 2023/0018027 A1* | 1/2023 | Bhide | G06F 9/541 |
| 2023/0134644 A1* | 5/2023 | Lorsignol | G06F 21/36 726/17 |
| 2023/0354041 A1* | 11/2023 | Termanini | H04L 63/0853 |
| 2024/0045942 A1* | 2/2024 | Lal | G06F 21/36 |
| 2024/0353922 A1* | 10/2024 | Dedonato | G06T 13/80 |

OTHER PUBLICATIONS

Gao et al., Research on the Security of Visual Reasoning CAPTCHA, USENIX, Aug. 2021 (Year: 2021).*

Wang et al., Extended Research on the Security of Visual Reasoning CAPTCHA, IEEE, 2023 (Year: 2023).*

Sano, Ayane et al. "Directcha: A proposal of spatiometric mental rotation CAPTCHA." 2016 14th Annual Conference on Privacy, Security and Trust (PST) (2016): 585-592. (Year: 2016).*

Wang et al., A Security Analysis of Captchas With Large Character Sets, IEEE, 2021 (Year: 2021).*

International Search Report dated Mar. 23, 2021 for corresponding International Application No. PCT/FR2021/050306, filed Feb. 22, 2021.

Written Opinion of the International Searching Authority dated Mar. 23, 2021 for corresponding International Application No. PCT/FR2021/050306, filed Feb. 22, 2021.

English translation of the Written Opinion of the International Searching Authority dated Mar. 31, 2021 for corresponding International Application No. PCT/FR2021/050306, filed Feb. 22, 2021.

* cited by examiner

METHOD AND DEVICE FOR ACCESS CONTROL

CROSS-REFERENCE TO RELATED APPLICATIONS

This Application is a Section 371 National Stage Application of International Application No. PCT/FR2021/050306, filed Feb. 22, 2021, which is incorporated by reference in its entirety and published as WO 2021/191516 A1 on Sep. 30, 2021, not in English.

1. FIELD OF THE INVENTION

The invention relates to a method for controlling access to a computing resource, the control intending more particularly to distinguish a human being from a robot, in particular in a virtual reality or augmented reality context.

2. PRIOR ART

There are nowadays methods for making access to a computing resource, such as a website, more reliable. In particular, in addition to an authentication process, a user may need to satisfy a test proving that he is a human being, in order to prevent computers, or robots, from fraudulently accessing the resources of the service. Such a test may be a "Captcha" (acronym for "Completely Automated Public Turing test to Tell Computers and Humans Apart"), making it possible to distinguish humans from robots.

In such a test, the server managing the website presents a Captcha to the user in order to determine whether he is actually human. If the validation of the test is correct, access to the resources of the service is authorized; otherwise, it is denied.

This type of method makes it possible to safeguard access to protected resources requiring authentication, such as for example proprietary and/or sensitive databases, production systems, healthcare systems, etc.

Various types of Captcha have been developed. They propose a problem with a solution that is easy for a human being (logical deduction, visual or auditory recognition, etc.) but difficult for a robot. For example:
  a "text" Captcha assumes visual recognition of a random text, deformed and made more complex by graphic "noise", with variable colors;
  a "mathematical" Captcha consists in giving a logic test (addition, equation to be solved, etc.);
  an "image" Captcha, based on an image or a set of images, generally proposes to recognize and select a shape in a decor, or to form a logic series of shapes and images.

Three-dimensional (3D) Captchas have emerged more recently, in the form of an offshoot of the text Captcha, adding a 3D deformation accessible to the human eye to the possible deformations. Other complex Captchas, called "reCaptchas", incorporate computer codes triggered by the user, which may be combined with image recognition and time management tailored to a human being (a computer possibly being faster or more predictable in certain tests).

However, with the evolution of computer technologies and computing or learning capabilities, in particular in the field of artificial intelligence, the means for bypassing or solving Captcha tests have become more numerous and improved. Some hacker solutions, allowing such tests to be satisfied automatically, have been developed, for example using tools for text recognition, "speech" to "text" translation, image recognition, code analysis, etc. Other hacker methods use human beings who are paid for this purpose or undesirably misappropriated. Such attacks are more often than not performed by way of a hacker site that is located between the terminal of a user and the server to which the terminal is connected in order to intercept the communications.

To confront this situation, the complexity of Captchas is continually increasing. However, the more complex the Captcha becomes, the more difficult it becomes to solve not only for a robot but also for a human, leading to frustration for the user and loss of attractiveness for the website.

There is therefore a need for a Captcha-based authentication method that is both robust and simple.

3. DISCLOSURE OF THE INVENTION

The invention aims to improve the prior art.

To this end, it proposes a method for controlling access to a service by a user, the method being implemented by an access device, the method comprising the following steps on the device to verify the human nature of a user:
  obtaining at least one three-dimensional virtual object and associated data, called solution data;
  commanding the rendering of said at least one virtual object for the user;
  obtaining interaction data on the interaction of the user with said at least one virtual object;
  if the interaction data correspond to the solution data, confirming the human nature of the user.

Advantageously, according to the invention, the user has to implement interactions with a three-dimensional object in order to be recognized as a human and access the service. This therefore involves solving a Captcha that is complex enough that a computer does not manage to do so.

A three-dimensional virtual object is understood here to mean a digital object that is developed in a three-dimensional space, such as for example a geometric object, or a natural object projected into a computing universe.

Interaction data on the interaction of the user are understood to mean data resulting from a human-machine interaction in which the user is able to move, manipulate 3D objects in a space formed by a computer screen or a three-dimensional virtual scene. The physical position of the elements in the space is relevant, as are the manipulations to which they are subjected (selection, displacement including translations and rotations, etc.). This interaction may be performed by the user's hand, a mouse, a virtual hand, a joystick, or any other object able to select and move virtual objects in a multidimensional and temporal space. A 3D space used for the interaction may be the real physical space, a representation simulated by a computer, or a combination of both. When the real space is used for the inputs, the users perform actions or give commands to the machine with the aid of an input device, which detects the 3D position of the action of the users. The simulated 3D virtual scene is projected onto the real environment by way of one or more output peripherals.

Solution data are understood to mean all digital data associated with the solution to the Captcha. These data may correspond to a set of interactions on one or more three-dimensional objects, such as for example a sequence of selections of multiple objects, each selection being followed by a manipulation of the object, in particular a transformation in the plane or in the space.

Thus, if the interaction data on the interaction of the user on the virtual objects correspond to the solution data, that is to say that they are the same or within a settable acceptable margin of error, the Captcha is deemed to be solved, and the user is deemed to be human.

According to one particular embodiment of the invention, a method as described above furthermore comprises a step of:

generating a two-dimensional projection space;
and the rendering consists in projecting said at least one three-dimensional virtual object in order to create the display in said two-dimensional space.

Advantageously, according to this embodiment, a two-dimensional screen, such as for example a TV or computer screen, may be implemented to solve the Captcha. The 3D objects are then projected onto this screen in 2D using any technique within the ability of a person skilled in the art, for example a parallel projection or perspective projection of the 3D object onto a plane. An object may be manipulated using a mouse, or via a touch interaction, etc.

According to another particular embodiment of the invention, a method as described above is characterized in that it furthermore comprises a step of:

generating a three-dimensional projection space comprising a virtual or mixed scene;
and the rendering consists in projecting said at least one three-dimensional virtual object in order to create the display in said scene.

Advantageously according to this embodiment, the user may, in the space of the virtual or mixed scene, select objects and manipulate them in order to solve the Captcha.

In the case of a virtual reality, the scene is generated artificially by a master device such as a computer, a smartphone, a tablet, etc. and projected onto the screen of a rendering device, such as a virtual headset (film, video game, 3D universe, etc.). This is what is meant by virtual scene. In the case of augmented reality, also called hybrid or mixed reality, virtual elements or information items (sounds, images, graphics, GPS positioning information, etc.) are added to the real world captured by a device such as a camera. These are superimposed on the real images so as to create a new environment, called "augmented" environment. Reference is in this case made to a mixed scene.

According to another particular embodiment of the invention, a method as described above is characterized in that the interaction data comprise at least one selection datum for selecting said at least one three-dimensional virtual object.

Advantageously according to this embodiment, one virtual object at least should be selected in order to solve the Captcha. It is thus possible to create for example a puzzle in the space, for example the selection of the successive phases of a virtual object, or through the successive selection of multiple virtual objects, etc.

According to another particular embodiment of the invention, a method as described above is characterized in that the interaction data comprise at least one transformation datum for transforming said at least one three-dimensional virtual object.

Advantageously according to this embodiment, a virtual object should undergo a transformation in order to solve the Captcha. It will be recalled that a transformation, in the space or in the plane, is a bijective application of the plane or the space to itself (affinity, homothety, translation, rotation, reflection, anti-rotation, screwing, etc.). Such a transformation may be intuitive to the user, while it proves unsolvable for a machine. This is for example the case of a rotation of an object in the space in order to access a hidden face.

According to another particular embodiment of the invention, a method as described above is characterized in that said at least one virtual object comprises at least one polyhedron.

Advantageously according to this embodiment, a large number of Captchas that are both complex and easy to generate by a computer are conceivable. Indeed, a polyhedron is a solid having a certain number of edges and faces, able to be reduced simply to a number of elementary equations, and therefore relatively simple to project into the space by using for example a base of geometric shapes.

According to one hardware aspect, the invention also relates to a device for controlling access to a service, comprising at least a memory and a processor that are configured to:

obtain at least one three-dimensional virtual object and associated data, called solution data;
command the rendering of said at least one virtual object for the user;
obtain interaction data on the interaction of the user with said at least one virtual object;
if the interaction data correspond to the solution data, confirm the human nature of the user.

The invention also relates to a system for controlling access to a service by a user, comprising at least:

a device as described above;
a terminal equipped with a two-dimensional screen for rendering said at least one virtual object;
a detection device for obtaining interaction data on the interaction of the user with said at least one virtual object.

The invention also relates to a system for controlling access to a service by a user, comprising at least:

a device as described above;
a rendering device for rendering a virtual or mixed scene so as to display said at least one virtual object in the scene;
a detection device for obtaining interaction data on the interaction of the user with said at least one virtual object in the scene.

The invention also relates to a system for controlling access to a service as described above, wherein the device for detecting interaction data on the interaction of the user with said at least one virtual object comprises inertial sensors, eye-tracking sensors, motion-tracking sensors or cameras.

The invention also relates to a system for controlling access to a service as described above, wherein the rendering device is a virtual reality headset.

The invention also relates to a system for controlling access to a service as described above, wherein the device for detecting interaction data comprises a joystick.

According to another functional aspect, the invention also comprises a method for creating a three-dimensional Captcha, comprising the steps of:

acquiring at least one three-dimensional object;
acquiring a set of solution data corresponding to at least one action for transforming said three-dimensional object.

The invention also relates to a computer program comprising instructions for implementing one of the above methods according to any one of the particular embodiments described above when said program is executed by a processor. The method may be implemented in various ways, in particular in hard-wired form or in software form.

This program may use any programming language and be in the form of source code, object code or intermediate code between source code and object code, such as in a partially compiled form, or in any other desirable form.

The invention also targets a computer-readable recording medium or information medium comprising instructions of a computer program as mentioned above. The abovementioned recording media may be any entity or device capable of storing the program. For example, the medium may comprise a storage means, such as a ROM, for example a CD-ROM or a microelectronic circuit ROM, or else a magnetic recording means, for example a hard disk. Moreover, the recording media may correspond to a transmissible medium such as an electrical or optical signal, which may be routed via an electrical or optical cable, by radio or by other means. The programs according to the invention may in particular be downloaded from an Internet network.

As an alternative, the recording media may correspond to an integrated circuit in which the program is incorporated, the circuit being designed to execute or to be used in the execution of the method in question.

4. LIST OF THE FIGURES

Other features and advantages of the invention will become more clearly apparent upon reading the following description of particular embodiments, given by way of simple illustrative and non-limiting examples, and the appended drawings, in which.

5. DESCRIPTION OF ONE EMBODIMENT OF THE INVENTION

Figure 1:
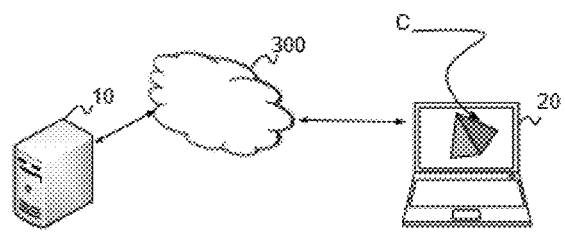
FIG. 1 illustrates an environment for implementing the invention according to one particular embodiment of the invention.

FIG. 1 illustrates one example of an environment for implementing the access method in the conventional case of accessing a service, in particular a Web service, in accordance with the HTTP or HTTPS client/server communication standards, via a client terminal.

Without loss of generality, such an access method may be based on other communication protocols such as for example FTP, TCP, etc. or be limited to local access on the terminal.

The access terminal 20 may be for example a fixed or mobile personal computer ("PC"), a digital tablet, or even a cell phone.

The access terminal 20 accesses a service that is secured by verifying the human nature of the user. The access may be provided for example by a Web browser. The service that the user wishes to access may be hosted on a remote server 10 able to be accessed via a communication network 300. For example, the service may be a website that the user is able to access either directly by entering the address of the website in the Web browser, or by a link from another website or a search engine. The verification of the human nature of the user may be requested for example by the destination website or by the search engine.

The access terminal 20 may be connected to the Internet or mobile communication network 300 by way of an access network, for example a wired or wireless access network.

The system also comprises an entity or device (DISP) for verifying the human nature of a user. The verification entity, not shown, may be located anywhere. For example, it is a software application installed on the terminal of the user or on an authentication terminal (not shown), or in an equipment of the communication network, for example the remote server 10, or another server, etc. The access method based on the verification of the human nature of a user implemented by the verification entity, and described in more detail below, may be made accessible by way of an application programming interface or API used by the service. In this case, the access terminal 20 may comprise an extension module for its Web browser, allowing a user to enter data, in particular relating to a Captcha C displayed on the screen of the terminal 20.

The Captcha C is preferably, according to this example, a 3D geometric Captcha. It takes the form of a polyhedron (prism, cube, parallelogram, octahedron, etc.) or a set of polyhedra (a sequence of cubes for example). According to the example shown in FIG. 1, the Captcha is a pyramid shown in three dimensions on the screen of the terminal 20 (which may itself be a 3D terminal, or a 2D terminal, in which case the three-dimensional object will be projected in two dimensions). Of course, the Captcha may be any three-dimensional, geometric (sphere, torus, cylinder, etc.) or natural object.

Figure 3:
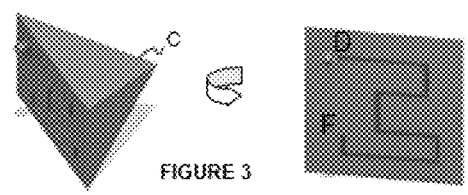
FIG. 3 illustrates a first example of a 3D Captcha.

FIG. 3 illustrates a first example of a 3D Captcha in more detail.

A three-dimensional virtual object C is generated in the form of a polyhedron (a tetrahedron according to the example), one of its four faces being hidden at the start of the method. The user has to drive the polyhedron in rotation as shown in the middle of FIG. 3. The user is invited to run through a circuit that is located on the hidden face. Optionally, it may be explicitly mentioned to the user that there is a need to access this hidden face. The user therefore has to manipulate the polyhedron until viewing the hidden face, and then run through the circuit as proposed for example on the right-hand part of the figure, from the marker D (start) to the marker F (end) in order to unlock access to the desired service. The need to manipulate the three-dimensional object, plus that of following the proposed circuit (with a finger, a mouse, a joystick, etc.) makes the Captcha complex and intuitive, such that a robot is not able to solve it.

Naturally, and without departing from the scope of the invention, it is possible to imagine multiple variants, such as for example:

- an image is generated on each face of the polyhedron. The user has to reconstruct an overall image, or associate images in a logical sequence (a color sequence for example). For this purpose, he has to virtually manipulate the 3D polyhedron and select, one by one, the faces corresponding to the image to be reconstructed or to the logical sequence.
- each face of the polyhedron is marked dynamically with a puzzle element, such as a chunk of a circuit or part of a domino. The user has to reconstruct the puzzle. For this purpose, he has to manipulate the 3D polyhedron and select the faces one by one.
- an alphanumeric character is generated randomly on a face of the polyhedron. Based on the selection of the faces, the user has to reconstruct a word, a sequence of characters, a phrase, etc. that is or is not presented to him on the screen.

Etc.

It is also possible to increase the difficulty level using more complex polyhedra, thereby increasing the number of accessible faces, or by adding a time counter, or by combining the problems to be solved, etc.

The set of data resulting from the manipulations that have to be applied to the objects to solve the Captcha constitute the solution data.

According to the embodiment shown in FIG. 1, a plug-in, or 3D virtual reality processing application, makes it possible for example to display and process the 3D Captcha via a Web browser in a webpage.

Figure 2:
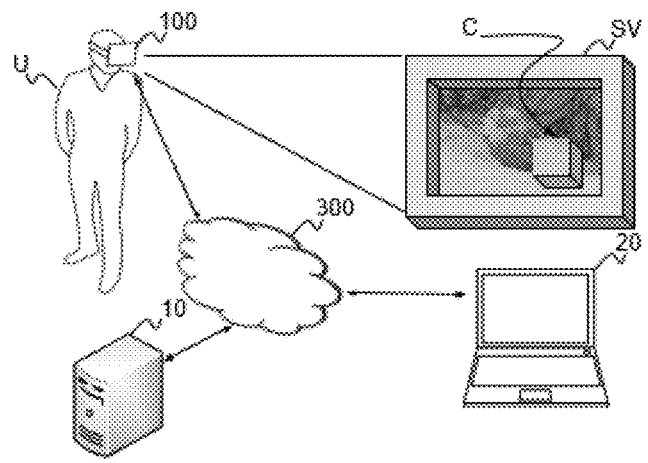
FIG. 2 illustrates an environment for implementing the method according to one particular embodiment of the invention.

FIG. 2 illustrates an environment for implementing the method according to a further particular embodiment of the invention. The implementation environment comprises the same elements as those presented in relation to FIG. 1. It is additionally located in a virtual reality or augmented reality environment. Such an environment is created artificially by a computer program. In the case of augmented reality, also called hybrid or mixed reality, virtual elements or information items (sounds, images, graphics, GPS positioning information, etc.) are added to the real world captured by a device such as a camera. These are superimposed on the real images in order to create a new environment, called "augmented" environment.

The user U is therefore equipped with a virtual reality or mixed reality headset (or virtual headset) 100.

Virtual headsets allow a user to immerse himself in a virtual or augmented reality corresponding to viewing audiovisual content.

The virtual headset 100 may take multiple forms, without otherwise departing from the scope of the invention: it may be associated with a processing terminal such as the terminal 20, and communicate therewith by way of the telecommunication network 300 (Internet, Wi-Fi, Bluetooth, fixed or mobile telephony network, etc.). The first terminal 100 is typically a virtual reality headset, such as the Quest headset from Oculus (registered trademark). However, the virtual headset 100 may also be a potentially passive optical equipment worn by the user, into which a smartphone or tablet mobile terminal is inserted. In this case, the two terminals are coincident. The virtual headset 100 may also be a smart equipment containing all of the modules needed to immerse the user. In this case, there is no need for an associated terminal. The virtual headset 100 generally comprises a screen designed to render panoramic video content and/or virtual objects, shown schematically here by the virtual scene SV. The virtual scene comprises for example panoramic video content that is consulted from a server hosting the content. The feeling of immersion is generally bolstered by stereoscopic or three-dimensional rendering of the video. The content is for example transmitted to the headset 100 in accordance with a Dynamic Adaptive Streaming protocol in accordance with the MPEG-DASH (Dynamic Adaptive Streaming over http) standard. The audiovisual content may also comprise a spatialized audio component. The set of these information items is called a virtual universe, or virtual scene (SV).

The user often has at least one joystick allowing him to move in the virtual universe and to interact with objects. He also generally has a pointer allowing him to ascertain the object and/or part of the scene with which he is able to interact. The pointer may correspond to a current position of the headset, of the joystick, or of the eyes of the user. In this last case for example, the user U of the headset, by fixing his gaze on part of the virtual scene, may position a pointer P on this part. Specific sensors (cameras, gyroscopes, etc.) may capture the user's gestures in order to reproduce them in the virtual world. He may thus evolve in the three-dimensional universe that is thus created and interact naturally with the virtual objects with the aid of simple gestures, with or without accessories.

According to this embodiment, the server 10, for example a gaming server, invites the user to solve a three-dimensional Captcha (C) in the virtual scene. As explained above in relation to FIG. 3, adding a spatial and/or dynamic dimension to modern Captchas makes it difficult for computing systems to analyze and hack this Captcha.

Figure 4:
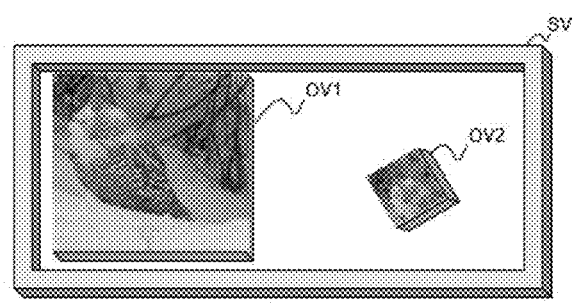
FIG. 4 illustrates a second example of a 3D Captcha.

FIG. 4 illustrates a second example of a 3D Captcha that may be used in this environment. According to this example, one or more virtual objects (polyhedra for example) OV2 are presented to the user in the virtual scene. The virtual object OV2 here is a cube that needs to be manipulated in the space in order to reconstruct a 3D puzzle (OV1) proposed to the user when he requests access to a site. As shown in the right-hand part of the figure, the user, in order to reconstruct the puzzle, has to select the cube, and then rotate it at various angles and successively select the faces in order to reconstruct the puzzle. The list of these expected basic actions constitutes the solution data. The list of the actions actually taken by the user constitutes the interaction data. Of course, the interaction data have to correspond to the solution data in order for the Captcha to be effectively solved. It will be noted that the 3D puzzle may be displayed in order to aid the user, or might not be displayed in order to bolster the complexity of the problem to be solved.

Figure 5:
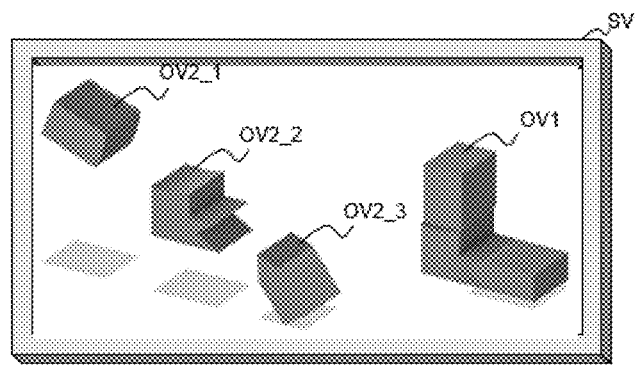
FIG. 5 illustrates a second example of a 3D Captcha.

FIG. 5 illustrates a third example of a 3D Captcha that may be used in this environment. According to this example, multiple virtual objects (irregular shapes consisting of multiple polyhedra) OV2_1, OV2_2 and OV2_3 are presented to the user in the virtual scene. The user has to enter them using for example a joystick, and then manipulate them in the space in order to reconstruct a 3D puzzle (OV1) proposed to the user when he requests access to a site. As before, the list of these expected basic actions constitutes the solution data. The list of the actions actually taken by the user constitutes the interaction data. The interaction data have to correspond to the solution data in order for the Captcha to be effectively solved, that is to say for the puzzle to be reconstructed here. It will be noted that the 3D puzzle OV1 may be displayed in order to aid the user, or might not be displayed in order to bolster the complexity of the problem to be solved.

Figure 6:
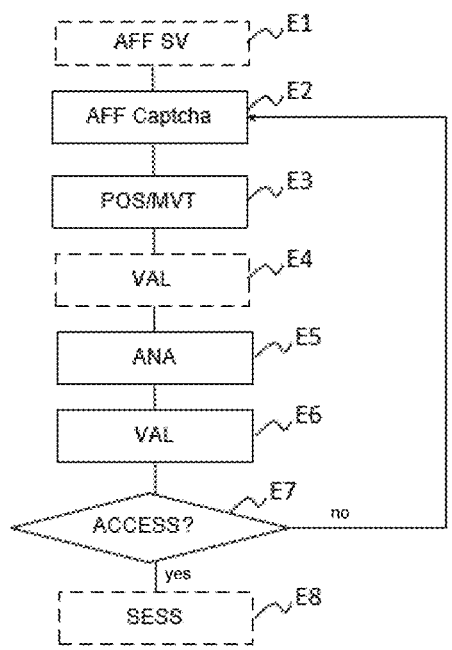
FIG. 6 illustrates steps of the method according to one particular embodiment of the invention.

FIG. 6 illustrates steps of the access method according to one embodiment of the invention.

The method according to this embodiment is implemented in a system comprising a virtual headset 100 associated, where applicable, with a terminal 20, as described above with reference to FIG. 2.

In a step E1, the headset 100 obtains a virtual scene (SV), or virtual universe, and projects it onto its screen. This may be for example a three-dimensional background image, or a room of a building in which the user U of the headset 100 is located. In the context of the first embodiment, the virtual scene may for example be coincident with the (2D) screen of the terminal 20.

In a step E2, the user attempts to access a site, for example a gaming site. At least one three-dimensional object (C, OV2) is displayed by the display device of the headset 100, such that the user U is able to see, by way of the headset 100, the Captcha superimposed on the existing virtual scene.

In a step E3, the user of the headset 100 positions a pointer on a virtual object, for example the one in FIG. 3 (tetrahedron) or in FIG. 4 (cube), or on the first object to be manipulated (set of tetrahedra) in FIG. 5. As an alternative, the virtual object may take the form of any three-dimensional, geometric and/or natural object. He selects said object and then manipulates the one or more virtual objects of the Captcha until it is solved. According to one variant, there is no pointer, but simply tracking of the eyes of the user by a device internal or external to the headset. One or more three-dimensional virtual objects may be generated for the Captcha, corresponding for example to complex polyhedra associated with alphanumeric characters, images, etc. that the user has to manipulate in the space in order to be allowed to access the game. These virtual objects may be positioned at various locations in the virtual universe. The objects may or may not be entered and manipulated in a predefined order (in sequence). This sequence, for example consisting of the ordered selection of the faces of the cube in FIG. 4, makes it possible to obtain the solution to the problem/challenge proposed by the Captcha, according to this example the solution to the puzzle.

One or more spatial coordinates of the pointer, along with its movement in the space, may be obtained by the motion sensors of the headset 100 in step E3, in the virtual environment, or by the eye-tracking sensors, or by the external cameras. The one or more obtained spatial coordinates may be used in order to compute the one or more positioning and motion data of the pointer with respect to the virtual objects of the Captcha. The positioning and motion data are then sent, in step E3, from the detection module to the analysis module. The motion may be any transformation in the space (displacement, isometry, similarity, etc.), the transformation preserving or not preserving angles and distances.

The sequence of manipulations on the one or more objects may be validated by the user in an optional step E4.

In step E5, the analysis module, after having retrieved the various positions of the pointer, reconstructs the sequence of movements of the virtual object (or objects) in the space, thus forming the interaction data.

Next, in a validation step E6, the access module compares the obtained interaction data (motion pattern, sequence of faces of the cube, path taken in the space, etc.) with those needed to solve the Captcha. If the comparison is correct, that is to say if the interaction data that are obtained are the same as or close enough to those corresponding to the solution, or solution data, access is validated, and step E7 is followed by a step E8 of accessing the site (gaming site, etc.). Close enough is understood to mean that a margin of error, or approximation, may be tolerated (for example when following a line or the positioning of an object in the space, it is conceivable to deviate slightly from the expected line/position). The margin of error will in this case be given in the form of a percentage, absolute error, etc.

If the solution fails, there is a return to step E2 to display the virtual objects of the Captcha again, or another Captcha, possibly with a more difficult solution, or else access to the site is barred for a certain time or definitively.

Figure 7:
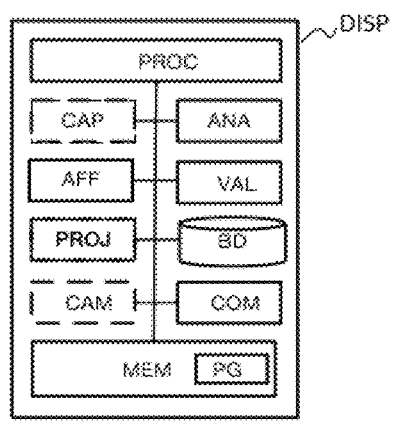
FIG. 7 illustrates a device according to one particular embodiment of the invention.

FIG. 7 illustrates a simplified structure of an access control device DISP according to one particular embodiment of the invention. Such a device is configured to implement the access control method according to any one of the particular embodiments of the invention described above.

According to one particular embodiment of the invention, the device DISP has the conventional architecture of a computer and comprises in particular a memory MEM, a processing unit, equipped for example with a processor PROC, and driven by the computer program PG stored in memory MEM. The computer program PG comprises instructions for implementing the steps of the access control method as described above according to any one of the embodiments when the program is executed by the processor PROC. On startup, the code instructions of the computer program PG are for example loaded into a memory before being executed by the processor PROC.

In particular, according to some particular embodiments of the invention, the device comprises
communication means COM, such as for example a network interface, allowing the device to connect to a telecommunication network and to exchange data with other devices via the network, and in particular to download portions of audiovisual content forming a 2D or 3D virtual scene. The communication means COM correspond for example to a Wi-Fi or cellular wireless network interface, or else an Ethernet interface or any other type of network interface suitable for exchanging data with other equipments. The content is for example transmitted to the headset 100 and/or to the terminal 20 of the system in accordance with a Dynamic Adaptive Streaming protocol in accordance with the MPEG-DASH (Dynamic Adaptive Streaming over http) standard.

analysis means ANA. The analysis may pertain to the data from motion sensors CAP. Such means may be implemented by computer program instructions. In particular, the analysis means ANA implement the analysis steps of the method described with reference to FIG. 6, aimed at retrieving the interactions of the user of the Captcha (movement pattern over a succession of virtual objects, etc.) in order to form the interaction data.

a screen, or display device AFF, designed to render a two-dimensional or three-dimensional virtual scene, and virtual objects. In one example, the display device is mounted on a pair of mixed reality spectacles or a mixed reality headset. In another example, it is the display device of a 2D terminal.

validation means VAL for comparing the movement or the sequence of movements reconstructed by the analysis means, that is to say the interaction data, with a reference movement or with a reference sequence corresponding to the solution data for the Captcha. The comparison means may typically compare the interaction data analyzed by the module ANA with predefined solution data stored in a database BD.

Optionally, in particular if the embodiment corresponds to a 3D virtual universe:
sensors CAP, such as for example inertial sensors: a gyroscope for measuring an angle of rotation of the virtual headset 100 with respect to a reference position, representative of the movement of the user's head, his hand when he manipulates a joystick, or any other part of his body, eye-tracking sensors, etc. forming a device for detecting interactions of the user with objects.

a camera CAM or any other real environment data acquisition device, for recording in particular the real or mixed scene that is located in front of the user and the movements of said user in the scene, a projection module PROJ for projecting the virtual scene and Captchas, a pointing module, a positioning data sending module, a positioning data obtainment module, a real environment data acquisition module, etc.

According to one particular embodiment of the invention, the device DISP described above is contained within a network gateway.

According to one particular embodiment of the invention, the management device DISP is contained within an equipment of the network.

The invention claimed is:

1. A method for controlling access to a service by a user, the method being implemented by an access device to verify a human nature of the user and comprising:
   generating a three-dimensional projection space comprising a virtual or mixed scene;
   obtaining at least one three-dimensional virtual object and associated data, called solution data;
   commanding a rendering of said at least one three-dimensional virtual object for the user by projecting said at least one three-dimensional virtual object onto said scene, in order to display said at least one three-dimensional virtual object in said scene;
   obtaining interaction data on interaction of the user with said at least one three-dimensional virtual object; and
   in response to the interaction data corresponding to the solution data, confirming the human nature of the user,
   wherein the at least one three-dimensional virtual object comprises at least one polyhedron, at least one of its faces being hidden, and said solution data includes the user accessing the hidden face.

2. The access control method as claimed in claim 1, wherein the interaction data comprise at least one selection datum for selecting said at least one three-dimensional virtual object.

3. The access control method as claimed in claim 1, wherein the interaction data comprise at least one transformation datum for transforming said at least one three-dimensional virtual object.

4. A device for controlling access to a service by a user, comprising:
   at least a non-transitory computer readable memory and a processor that are configured to:
   generate a three-dimensional projection space comprising a virtual or mixed scene;
   obtain at least one three-dimensional virtual object and associated data, called solution data, in order to display said at least one three-dimensional virtual object in said scene;
   command a rendering of said at least one three-dimensional virtual object for the user by projecting said at least one three-dimensional virtual object onto said scene;
   obtain interaction data on an interaction of the user with said at least one three-dimensional virtual object;
   in response to the interaction data corresponding to the solution data, confirm a human nature of the user,
   wherein the at least one three-dimensional virtual object comprises at least one polyhedron, at least one of its faces being hidden, and said solution data includes the user accessing the hidden face.

5. A system for controlling access to a service by a user, comprising at least
   an access device comprising at least a non-transitory computer readable memory and a processor that are configured to:
   generate a three-dimensional projection space comprising a virtual or mixed scene;
   obtain at least one three-dimensional virtual object and associated data, called solution data, in order to display said at least one three-dimensional virtual object in said scene;
   command a rendering of said at least one three-dimensional virtual object for the user on a rendering device by projecting said at least one three-dimensional virtual object onto said scene;
   obtain interaction data on an interaction of the user with said at least one three-dimensional virtual object; and
   in response to the interaction data corresponding to the solution data, confirm a human nature of the user,
   wherein the at least one three-dimensional virtual object comprises at least one polyhedron, at least one of its faces being hidden, and said solution data includes the user accessing the hidden face;
   the rendering device configured to render a virtual or mixed scene so as to render said at least one three-dimensional virtual object in said scene, said rendering comprising projecting said at least one three-dimensional virtual object in order to display it in said scene; and
   a detection device configured to obtain the interaction data on the interaction of the user with said at least one three-dimensional virtual object in the scene.

6. The system for controlling access to a service as claimed in claim 5, wherein the detection device comprises inertial sensors, eye-tracking sensors, motion-tracking sensors or cameras.

7. The system for controlling access to a service as claimed in claim 5, wherein the rendering device is a virtual reality headset.

8. The system for controlling access to a service as claimed in claim 5, wherein the detection device comprises a joystick.

9. A non-transitory computer readable medium comprising instructions stored thereon for implementing a method, which controls access to a service by a user to verify a human nature of the user, when the program is executed by a processor of an access device, wherein the method comprises:
   generating a three-dimensional projection space comprising a virtual or mixed scene;
   obtaining at least one three-dimensional virtual object and associated data, called solution data;
   commanding a rendering of said at least one three-dimensional virtual object for the user by projecting said at least one three-dimensional virtual object onto said scene, in order to display said at least one three-dimensional virtual object in said scene;
   obtaining interaction data on interaction of the user with said at least one three-dimensional virtual object; and
   in response to the interaction data corresponding to the solution data, confirming the human nature of the user,
   wherein the at least one three-dimensional virtual object comprises at least one polyhedron, at least one of its faces being hidden, and said solution data includes the user accessing the hidden face.

* * * * *